May 11, 1954 F. J. SCHUESSLER 2,678,357
MAGNETIC SOUND AND COMBINED OPTICAL AND
MAGNETIC SOUND TRANSLATING APPARATUS
Filed March 27, 1951 4 Sheets-Sheet 2

INVENTOR.
Frank J. Schuessler
BY
Robert F. Miehle
Atty.

May 11, 1954   F. J. SCHUESSLER   2,678,357
MAGNETIC SOUND AND COMBINED OPTICAL AND
MAGNETIC SOUND TRANSLATING APPARATUS
Filed March 27, 1951   4 Sheets-Sheet 3

INVENTOR.
Frank J. Schuessler
BY
Robert F. Miehle
Atty.

May 11, 1954   F. J. SCHUESSLER   2,678,357
MAGNETIC SOUND AND COMBINED OPTICAL AND
MAGNETIC SOUND TRANSLATING APPARATUS
Filed March 27, 1951   4 Sheets-Sheet 4
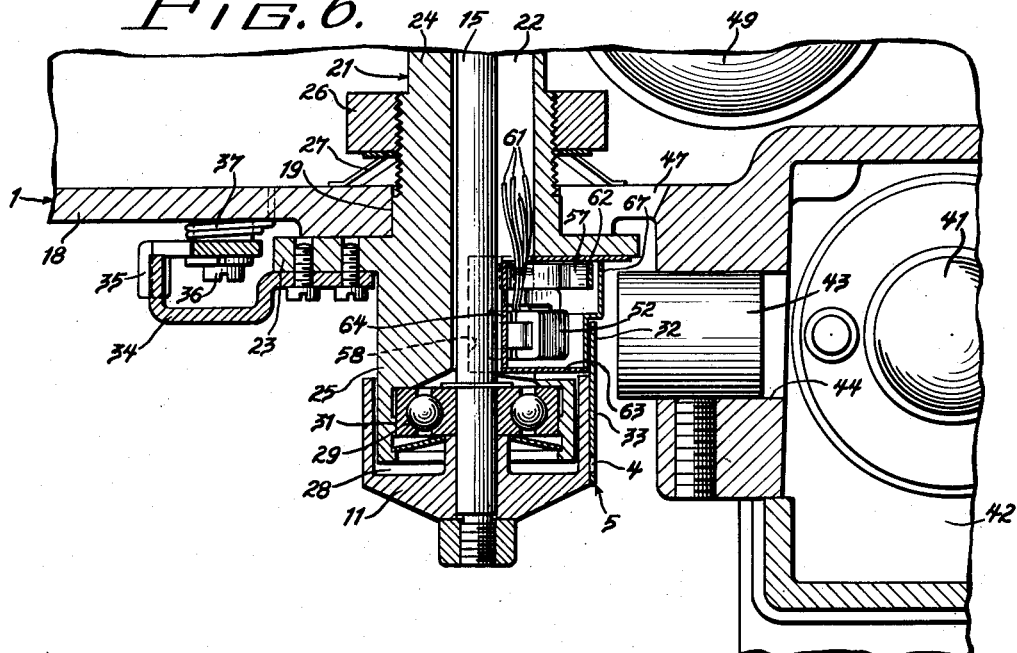
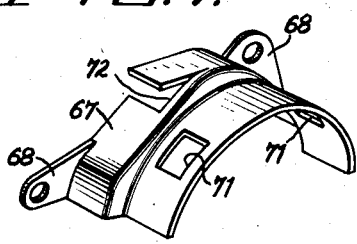
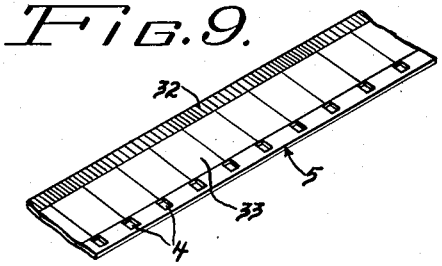
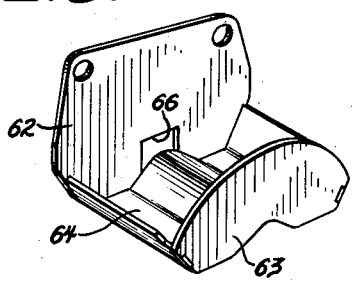
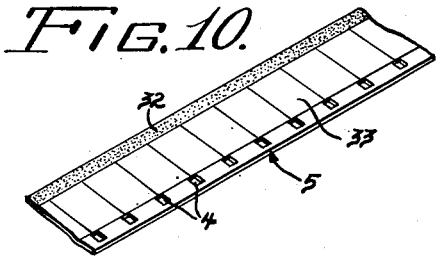
INVENTOR,
Frank J. Schuessler
BY
Robert F. Miehle
Atty.

Patented May 11, 1954

2,678,357

UNITED STATES PATENT OFFICE 2,678,357

MAGNETIC SOUND AND COMBINED OPTICAL AND MAGNETIC SOUND TRANSLATING APPARATUS

Frank J. Schuessler, Chicago, Ill., assignor to Bell & Howell Company, Chicago, Ill., a corporation of Illinois Application March 27, 1951, Serial No. 217,843

7 Claims. (Cl. 179—100.2)

My invention relates particularly to sound motion picture projectors although not limited to this use alone.

Objects of the invention reside in the provision of novel and effective combined optical and magnetic sound translating apparatus providing for the selective use of optical and magnetic sound translation and of novel and effective magnetic sound translating apparatus which is arranged to be placed out of contact with a sound record strip when the magnetic translating apparatus is not in use, which is compact, which is particularly adapted for sound motion picture projectors utilizing usual motion picture film, and which is more particularly adapted for a sound motion picture projector utilizing a usual inertia "sound" drum adapted to guide at a uniform velocity a fed motion picture record film strip thereabout, in the form of an open loop and with the sound record portion of the film strip overhanging an end of the drum, past a location where the translating apparatus cooperates with the sound record portion of the film strip.

The invention will be better understood by reference to the accompanying drawing forming a part hereof and in which—

Figure 6 is a partial sectional view taken similarly to Figure 2 and showing parts in different positions than those in which they are shown in Figure 2;

Figures 7 and 8 are perspective views of the shields of the electromagnetic heads of the apparatus; and Figures 9 and 10 are perspective views respectively of optical and magnetic sound motion picture record film strips suitable for use on the apparatus of my invention.

Figure 1:
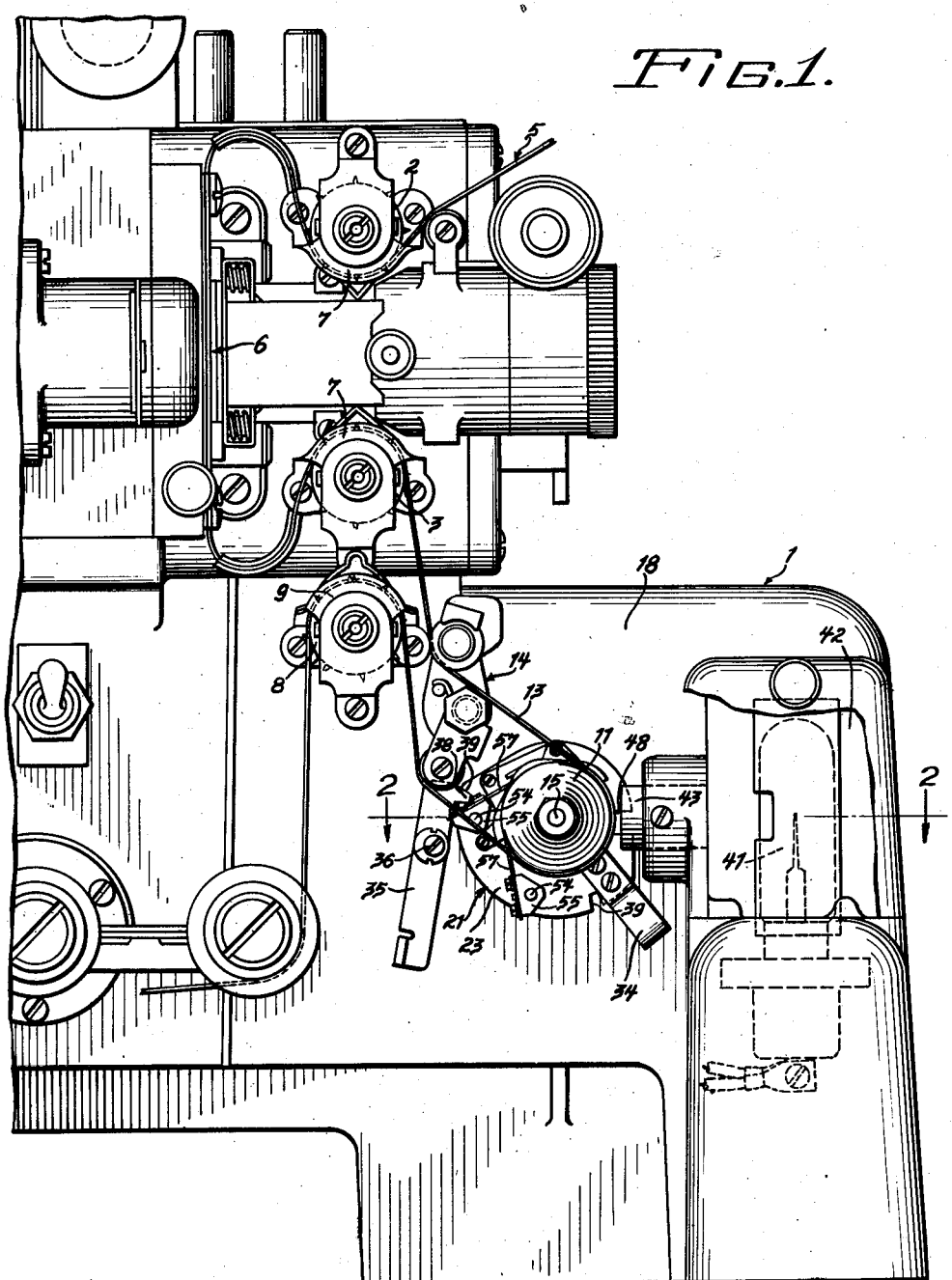
Figure 1 is a partial side elevation of a sound motion picture projecting machine embodying my invention.
Figure 2:
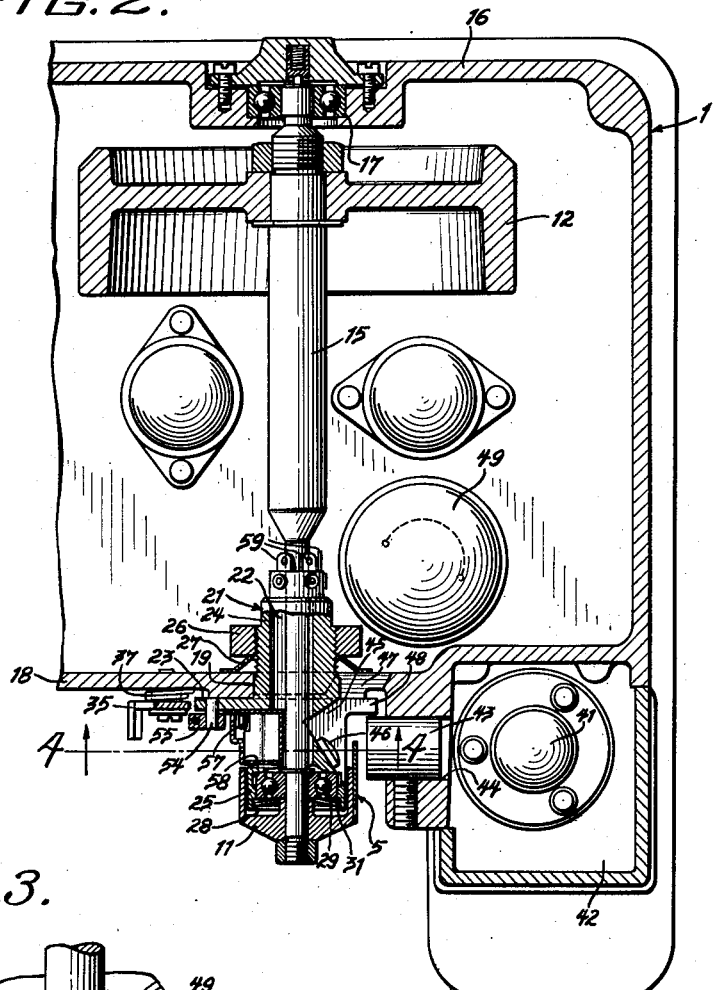
Figure 2 is a partial sectional view taken substantially on the line 2—2 of Figure 1.

Referring to the drawing, 1 designates a hollow casing forming the base of a sound motion picture projecting machine, see Figures 1 and 2, and disposed upwardly on the frame is a usual motion picture projecting mechanism comprising two vertically spaced rotatable constant feed sprockets 2 and 3 which engage usual feed perforations, designated at 4 in Figures 9 and 10, of a sound and motion picture record bearing photographic film strip 5 and feed it to and from a projection apertured intermittent feed guide 6 wherein the film is fed intermittently in a downward direction by a usual intermittent feed mechanism not shown, the film being retained in engagement with the sprockets 2 and 3 by usual retaining devices 7.

A third rotatable constant feed sprocket 8 is mounted on the casing 1 below the sprocket 3 and engages the feed perforations of the film strip 5 for further constantly feeding the same, the film being retained in engagement with the sprocket 8 by a usual releasable retaining device 9. The sprockets 2, 3, 8 and the intermittent feed mechanism are driven in unison to feed the film strip at the same rate by a usual driving mechanism not shown.

A "sound" drum 11 is rotatably mounted on an axis in parallelism with those of the sprockets 2, 3 and 8, and a flywheel 12 is connected with the drum to augment the momentum thereof, as hereinafter described. The sprockets 3 and 8 feed the film strip 5 in the form of an open loop 13 about the drum 11 and to rotate the drum, these sprockets engaging the strip at the ends of the loop and constantly feeding the film on both sides of the drum so that the drum guides the film thereabout in the form of the open loop. A tensioning device, generally designated at 14, engages the stretches of the loop 13 between the drum 11 and the sprockets 3 and 8 and serves to frictionally engage the film strip about the drum and cooperates with the momentum of the drum with a view toward maintaining an accurately uniform velocity of the film strip about the drum.

A rotatable shaft 15, extending within the casing 1 in parallelism with the sprockets 2, 3 and 8, see Figure 2, has its rear end rotatably mounted on the rear wall 16 of the casing 1 by means of a bearing 17, and the flywheel 12 is disposed within the casing and is secured on the rear portion of this shaft. The shaft 15 projects outwardly of the front wall 18 of the casing through a relatively large aperture 19 in the front wall, and the drum 11 is secured on the front end of the shaft for rotation therewith and is spaced forwardly from the front wall of the casing.

Figure 3:
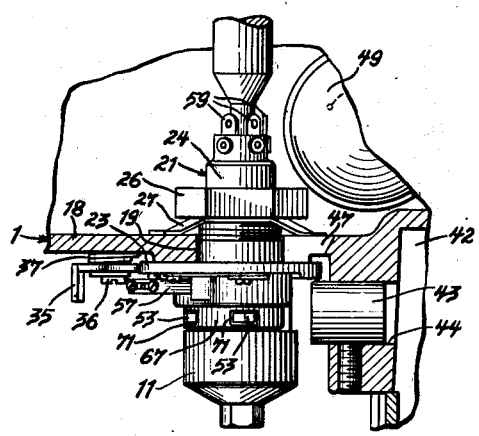
Figure 3 is a partial sectional view taken similarly to Figure 2.

A carrier 21, see particularly Figures 2, 3 and 6, is arranged inwardly of the drum 11 and is mounted on the front casing wall 18 for pivotal movement about the axis of the shaft 15 and is provided with an axial bore 22 through which the shaft extends. The carrier comprises an intermediate radial flange 23 exterior of the front casing wall 18 and rearwardly engaged thereagainst and oppositely extending inner and outer axial hubs 24 and 25 of which the inner hub 24 extends rearwardly through the front casing wall aperture 19 and is pivotally engaged therein. A nut 26 is screw-threaded on the inner hub 24 inwardly of the front casing wall 18 and a spring washer 27 is engaged on the inner hub between the front casing wall and the nut, and the nut and washer, the pivotal engagement of the inner hub in the front casing wall aperture 19 and the rearward engagement of the radial flange 23 against the front casing wall 18 constitute the pivotal mounting of the carrier on the front casing wall.

The drum 11 is provided with an axial bore 28 extending from the inner end thereof, and the outer carrier hub 25 projects into this bore. A bearing 29 within the drum bore 28, is mounted within an enlarged outer bore portion 31 of the outer carrier hub 25 and carries the forward end of the shaft 15 for rotation on this hub.

Referring to Figures 9 and 10, the film strip 5 as usual has the feed perforations 4 extending along one edge thereof, and has a relatively narrow sound record portion 32 extending along the other edge thereof and a relatively wide motion picture record portion 33 extending between the feed perforations and the sound record portion, the sound record portion of the film strip of Figure 9 being photographic and therefor optical and the sound record portion of the film strip of Figure 10 being magnetic and comprising finely divided granular magnetic material bonded to the film strip.

The drum 11 is adapted to guide the film strip 5 thereabout with the sound record portion 32 of the film strip overhanging the inner end of the drum as shown in Figures 2 and 6, for cooperation of a sound translating apparatus with the sound record portion of the strip.

Figure 5:
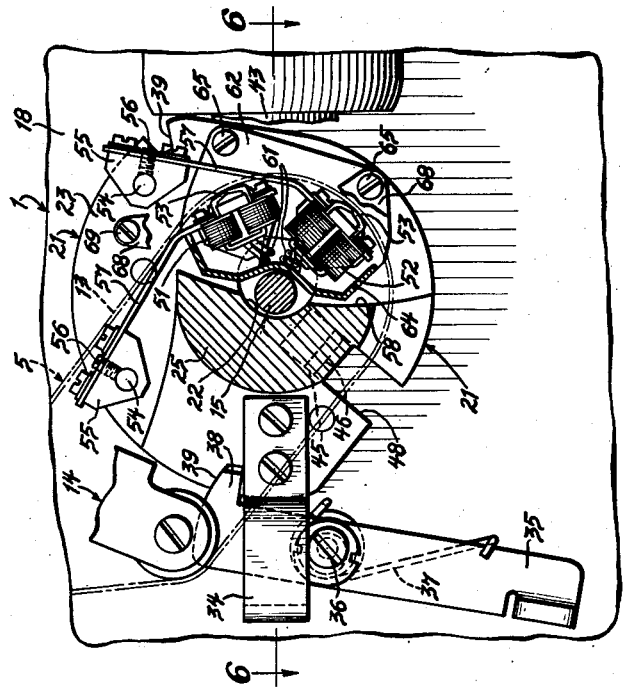
Figure 5 is a partial sectional view taken similarly to Figure 4 and showing parts in different positions than those in which they are shown in Figure 4.
Figure 4:
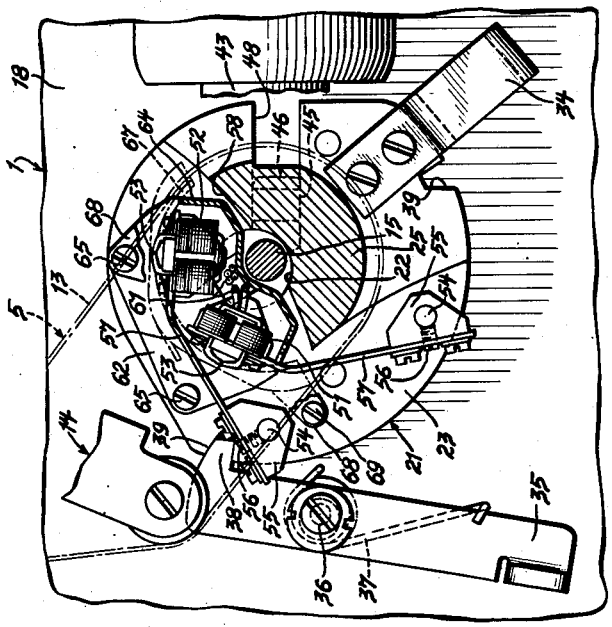
Figure 4 is a partial sectional view taken substantially on the line 4—4 of Figure 2.

The flange 23 of the carrier 21 is provided with a handle 34 for manually actuating the carrier on its pivotal axis, see particularly Figures 1, 4 and 5, and a latch lever 35 is intermediately pivoted as designated at 36 on the front casing wall 18 for movement into and out of latching position and is urged into latching position by a spring 37. A latch lug 38 on the latch lever is alternately engageable in two angularly spaced latch notches 39 in the periphery of the carrier flange 23 for releasably positioning the carrier in either of two pivotal positions for selectively effecting cooperation of optical and magnetic sound translating apparatus, hereinafter described, with the sound record portion of the film strip at the drum 11 depending upon whether the sound record of the film strip being used is optical or magnetic.

An exciter lamp 41, see Figures 1, 2 and 6, is arranged within an enclosure 42 on the casing 1 and projecting forwardly from the front casing wall 18 at one side of the drum 11, and a usual optical slit device 43 is mounted in a horizontal bore 44 through a wall of the enclosure and projects a narrow beam of light from the exciter lamp through the optical sound record portion of the film strip at the drum, the sound record portion overhanging the inner end of the drum as hereinbefore described. The outer carrier hub 25 is provided with a notch 45, and an optical sound translator reflector 46 is secured on this hub within the notch and when the carrier 21 is in one pivotal position thereof, as shown in Figures 1 to 4, it reflects light projected through the optical sound record portion of the fed film strip by the slit device 43 through an opening 47 in the front casing wall 18 and a slot 48 in the carrier flange 23 to a usual photoelectric cell 49 within the casing 1 where the light impulses effected by the sound record on the film strip are translated into electrical impulses for translation into sound through a usual amplifier within the casing 1 and loud speaker not shown.

Two electromagnetic heads 51 and 52 are mounted on the flange 23 of the carrier 21 in adjacently spaced relation about the pivotal axis of the carrier and are spaced from the optical sound translator reflector about the pivotal axis of the carrier for selectively positioning the reflector and the electromagnetic heads in functioning position cooperative with the loop of the sound record portion of the film strip at the drum 11 with positioning of the carrier in the different pivotal positions thereof as established by the latch lever 35 and carrier flange notches 39, the optical sound translating position of the carrier being shown in Figures 1 to 4, and the magnetic sound translating position of the carrier being shown in Figures 5 and 6.

The reflector 46 and the electromagnetic heads 51 and 52, when in functioning position are cooperative with and inwardly of the loop of the sound record portion of the film strip at the drum 11, the gapped core portions 53 of the electromagnetic heads facing outwardly from the drum axis and the heads being resiliently mounted to yieldably urge the gapped core portions outwardly against the sound record portion of the film strip at the drum as shown in Figure 5, and the reflector and electromagnetic heads 51 and 52 are so spaced that the electromagnetic heads are disposed at the opening of the loop 13 of the film strip when the reflector is in functioning position as shown in Figure 4, so that the gapped core portions 53 do not contact the film strip when they are not being employed.

The mounting of each electromagnetic head on the carrier flange 23, see Figures 1, 4 and 5, comprises a forwardly projecting stud 54 fixed on the carrier flange 23 and spaced a greater distance from the axis of the drum 11 than the radius of the drum, a bored support block 55 pivotally engaged on the stud and secured in pivotally adjusted position thereon by a set screw 56, and a spring arm 57 having one end thereof secured on the support block 55 and extending in a radial plane of the axis of the drum 11 inwardly of the inner edge of the film strip and having an electromagnetic head 51 or 52 secured on the free end thereof. This arrangement permits of an adequate spring arm length and adjustment of the spring arm to provide the desired pressure of the electromagnetic heads against the film strip. The electromagnetic heads 51 and 52 are disposed close to the axis of the carrier 21 and shaft 15 for the positioning of the heads inwardly of the sound record portion of the film strip at the drum 11, and the outer carrier hub 25 is cut away to form a recess 58, see Figures 4 and 5, for the accommodation of the heads.

The electromagnetic heads 51 and 52 are connected with insulated terminals 59, see Figure 6, on the inner end of the inner carrier hub 24 within the casing by means of insulated conductors 61 extending through the axial bore 22 of the carrier 21, the bore 22 being sufficiently large and arranged eccentrically of the axis of the carrier and of the shaft 15 to accommodate the shaft and conductors. The terminals 58 provide for convenient connection with instrumentalities, not shown, cooperating with the electromagnetic heads such as the amplifier, not shown, within the casing.

When the electromagnetic heads 51 and 52 are in functioning position, the fed film strip first passes the head 51 and then the head 52. The head 51 constitutes an "erase" head which is energized from a high frequency source to condition the magnetic sound record portion of the film strip for recording or to erase a recording on the magnetic sound record portion of the film strip preparatory to placing another recording thereon, and the head 52 constitutes a magnetic translator head which for magnetically recording on the magnetic sound record portion of the film strip, is connected to the output of an amplifier for recording sound impulses impressed on the input of the amplifier, and which for reproducing from a magnetic sound record on the magnetic sound record portion of the film strip, is connected to the input of the amplifier for reproducing the sound record through a loud speaker connected to the output of the amplifier.

An inner shield, see Figures 4, 5, 6 and 8, comprising inner and outer end wall members 62 and 63 and a channel shaped bottom and side wall member 64 extending between and secured with the end wall members to form a partial enclosure therewith, is arranged within the recess 58 of the outer carrier hub 25 with the opening thereof facing outwardly of the axis of the carrier, and the electromagnetic heads 51 and 52 are arranged within the partial enclosure thereof. The inner wall 62 of this shield is extended outwardly and is secured to the carrier flange 23 by headed screws 65, and is provided with an opening 66 adjoining the intermediate portion of the bottom and side wall member 69 and through which the conductors 61 extend. An outer shield 67 of arcuate form is arranged about the axis of the carrier 21 outwardly of the electromagnetic heads and cooperates with the inner shield in substantially enclosing the heads, and the outer shield is secured to the carrier flange 23 by apertured lugs 68, one of the screws 65 and another headed screw 69.

The outer shield 67 is provided with angularly spaced apertures 71 through which the gapped core portions 53 of the electromagnetic heads 51 and 52 project for contact with the sound record portion of the film strip, and an inner portion of this shield is provided with an opening 72 through which the spring arm 57 of the electromagnetic head 52 extends, the spring arm 57 of the electromagnetic head 51 extending past an end of the outer shield.

The inner shield 62—63—64 and the outer shield 67 are formed of highly magnetically permeable material, such as an alloy of iron, copper, chromium and a large percentage of nickel, to shield the electromagnetic heads 51 and 52 from external magnetic fields which might otherwise interfere with magnetic recording or reproduction, the drum 11 being preferably of non-magnetic material such as non-magnetic stainless steel and the carrier being preferably of non-magnetic material such as brass.

While I have thus described my invention, I do not wish to be limited to the precise details described, as changes may be readily made without departing from the spirit of my invention, but having thus described my invention, I claim as new and desire to secure by Letters Patent the following:

1. In a combined optical and magnetic sound translating apparatus, the combination of a rotatably mounted guide drum adapted for guiding a fed sound record strip thereabout in the form of an open loop and with a sound record portion of the strip overhanging an end of said drum, a carrier mounted for pivotal movement about the axis of said drum, an optical sound translator reflector and a magnetic sound translator electromagnetic head mounted on said carrier in spaced relation about the pivotal axis thereof for selectively positioning said translator elements in functioning position cooperative with and inwardly of the loop of the sound record portion of the strip at said drum with positioning of said carrier in different pivotal positions and so spaced that said electromagnetic head is disposed at the opening of said loop of the strip when said reflector is in functioning position, and the mounting of said electromagnetic head on said carrier comprising a resilient mounting adapted to yieldably urge said head against the inner surface of said loop of the record portion of the strip when said head is in functioning position.

2. In a combined optical and magnetic sound translating apparatus, the combination of a rotatably mounted shaft, a guide drum mounted on said shaft for rotation therewith and adapted for guiding a fed sound record strip thereabout in the form of an open loop and with a sound record portion of the strip overhanging an end of said drum, a carrier mounted for pivotal movement about the axis of said shaft and provided with an axial bore through which said shaft extends, an optical sound translator reflector and a magnetic sound translator electromagnetic head mounted on said carrier in spaced relation about the pivotal axis thereof for selectively positioning said translator elements in functioning position cooperative with and inwardly of the loop of the sound record portion of the strip at said drum with positioning of said carrier in different pivotal positions and so spaced that said electromagnetic head is disposed at the opening of said loop of the strip when said reflector is in functioning position, and the mounting of said electromagnetic head on said carrier comprising a resilient mounting adapted to yieldably urge said head against the inner surface of said loop of the record portion of the strip when said head is in functioning position.

3. In a combined optical and magnetic sound translating apparatus, the combination of a casing, a rotatably mounted shaft carried with said casing and projecting outwardly through an aperture in a wall thereof, a guide drum spaced outwardly from said casing wall and mounted on the projecting end of said shaft for rotation therewith and adapted for guiding a fed sound record strip thereabout in the form of an open loop and with a sound record portion of the strip overhanging the inner end of said drum, a carrier arranged inwardly of said drum and mounted on said casing wall for pivotal movement about the axis of said shaft and provided with an axial bore through which said shaft extends and comprising an intermediate radial flange exterior of said casing wall and spaced inwardly from said drum and oppositely extending inner and outer axial hubs of which the inner hub is pivotally engaged in said casing wall aperture, an optical sound translator reflector and a magnetic sound translator electromagnetic head respectively mounted on said outer hub and flange of said carrier in spaced relation about the pivotal axis thereof for selectively positioning said translator elements in functioning position cooperative with and inwardly of the loop of the sound record portion of the strip at said drum with positioning of said carrier in different pivotal positions and so spaced that said electromagnetic head is disposed at the opening of said loop of the strip when said reflector is in functioning position, and the mounting of said electromagnetic head comprising a spring arm having one end thereof fixed on said carrier flange at a location spaced from said shaft axis a greater distance than the radius of said drum and extending in a radial plane of said axis and carrying said head at its other end and adapted to yieldably urge said head against said loop of the sound record portion of the strip when said head is in functioning position.

4. In a combined optical and magnetic sound translating apparatus, the combination of a casing, a rotatably mounted shaft carried with said casing and projecting outwardly through an aperture in a wall thereof, a guide drum spaced outwardly from said casing wall and mounted on the projecting end of said shaft for rotation therewith and adapted for guiding a fed sound record strip thereabout in the form of an open loop and with a sound record portion of the strip overhanging the inner end of said drum and said drum being provided with an axial bore extending from the inner end thereof, a carrier arranged inwardly of said drum and mounted on said casing wall for pivotal movement about the axis of said shaft and provided with an axial bore through which said shaft extends and with an axial hub projecting into said drum bore, a bearing within said drum bore and carrying said shaft for rotation on said carrier hub, and optional and magnetic sound translator elements mounted on said carrier in spaced relation about the pivotal axis thereof for selectively positioning said translator elements in functioning position cooperative with and inwardly of the loop of the sound record portion of the strip at said drum with positioning of said carrier in different pivotal positions.

5. In a combined optical and magnetic sound translating apparatus, the combination of a casing, a rotatably mounted shaft carried with said casing and projecting outwardly through an aperture in a wall thereof, a guide drum spaced outwardly from said casing wall and mounted on the projecting end of said shaft for rotation therewith and adapted for guiding a fed sound record strip thereabout in the form of an open loop and with a sound record portion of the strip overhanging the inner end of said drum and said drum being provided with an axial bore extending from the inner end thereof, a carrier arranged inwardly of said drum and mounted on said casing wall for pivotal movement about the axis of said shaft and provided with an axial bore through which said shaft extends and comprising an intermediate radial flange exterior of said casing wall and spaced inwardly from said drum and oppositely extending inner and outer axial hubs of which the inner hub is pivotally engaged in said casing wall aperture and the outer hub projects into said drum bore, a bearing within said drum bore and carrying said shaft for rotation on said outer carrier hub, an optical sound translator reflector and a magnetic sound translator electromagnetic head respectively mounted on said outer hub and flange of said carrier in spaced relation about the pivotal axis thereof for selectively positioning said translator elements in functioning position cooperative with and inwardly of the loop of the sound record portion of the strip at said drum with positioning of said carrier in different pivotal positions and so spaced that said electromagnetic head is disposed at the opening of said loop of the strip when said reflector is in functioning position, and the mounting of said electromagnetic head comprising a spring arm having one end thereof fixed on said carrier flange at a location spaced from said shaft axis a greater distance than the radius of said drum and extending in a radial plane of said axis and carrying said head at its other end and adapted to yieldably urge said head against said loop of the sound record portion of the strip when said head is in functioning position.

6. In a magnetic sound translating apparatus, the combination of a casing, a rotatably mounted shaft carried with said casing and projecting outwardly through an aperture in a wall thereof, a guide drum spaced outwardly from said casing wall and mounted on the projecting portion of said shaft for rotation therewith and adapted for guiding a fed sound record strip thereabout in the form of an open loop and with a sound record portion of the strip overhanging the inner end of said drum, a carrier arranged inwardly of said drum and mounted on said casing wall for pivotal movement about the axis of said shaft and provided with an axial bore through which said shaft extends, an electromagnetic head mounted on said carrier for selectively positioning said head in functioning position cooperative with and inwardly of the loop of the sound record portion of the strip at said drum and in non functioning position at the opening of said loop with positioning of said carrier in different pivotal positions, and at least one electrical conductor connected with said electromagnetic head and extending therefrom through said axial bore and into the interior of said casing.

7. In a magnetic sound translating apparatus, the combination of a casing, a rotatably mounted shaft carried with said casing and projecting outwardly through an aperture in a wall thereof, a guide drum spaced outwardly from said casing wall and mounted on the projecting portion of said shaft for rotation therewith and adapted for guiding a fed sound record strip thereabout in the form of an open loop and with a sound record portion of the strip overhanging the inner end of said drum, a carrier arranged inwardly of said drum and mounted on said casing wall for pivotal movement about the axis of said shaft and provided with an axial bore through which said shaft extends and comprising a radial flange exterior of said casing wall and an axial hub projecting inwardly from said flange and pivotally engaged in said casing wall aperture, an electromagnetic head, a spring arm having one end thereof fixed on said flange at a location spaced from the shaft axis a greater distance than the radius of said drum and extending in a radial plane of said axis and carrying said head at its other end for selectively positioning said head in functioning position cooperative with and inwardly of the loop of the sound record portion of the strip at said drum and in nonfunctioning position at the opening of said loop with positioning of said carrier in different pivotal positions, and at least one electrical conductor connected with said electromagnetic head and extending therefrom through said axial bore and into the interior of said casing.

References Cited in the file of this patent

UNITED STATES PATENTS

| Number | Name | Date |
|---|---|---|
| 2,043,871 | Whitman | June 9, 1936 |
| 2,518,556 | Kolb | Aug. 15, 1950 |
| 2,540,406 | Ranger | Feb. 6, 1951 |
| 2,605,364 | Masterson | July 29, 1952 |

FOREIGN PATENTS

| Number | Country | Date |
|---|---|---|
| 69,273 | Norway | May 28, 1945 |

OTHER REFERENCES

S. M. P. E., Nov. 1948, pp. 481–488.